Figure 1:
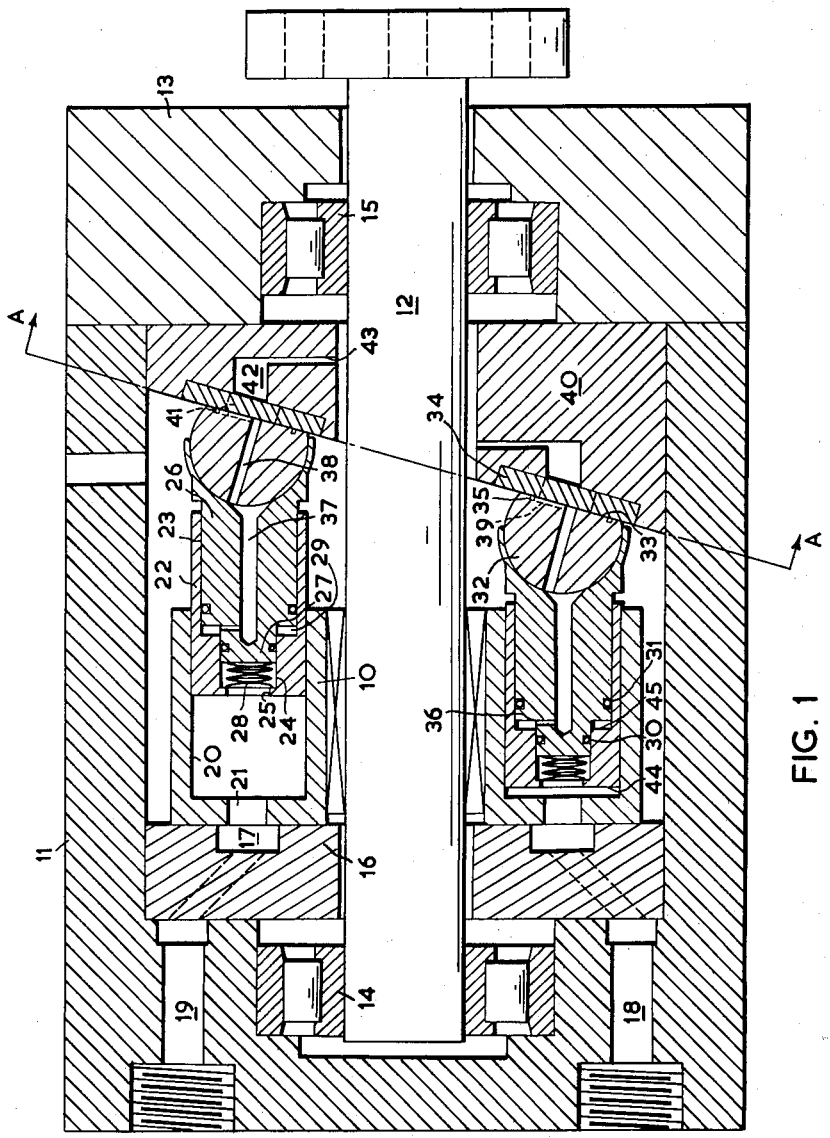

April 18, 1961 G. M. M. MAGILL 2,980,077
HYDRAULIC DEVICES
Filed March 3, 1960 2 Sheets-Sheet 1

Inventor:
George Maurice Martin Magill
By
Stevens, Davis, Miller & Mosher
Attorneys

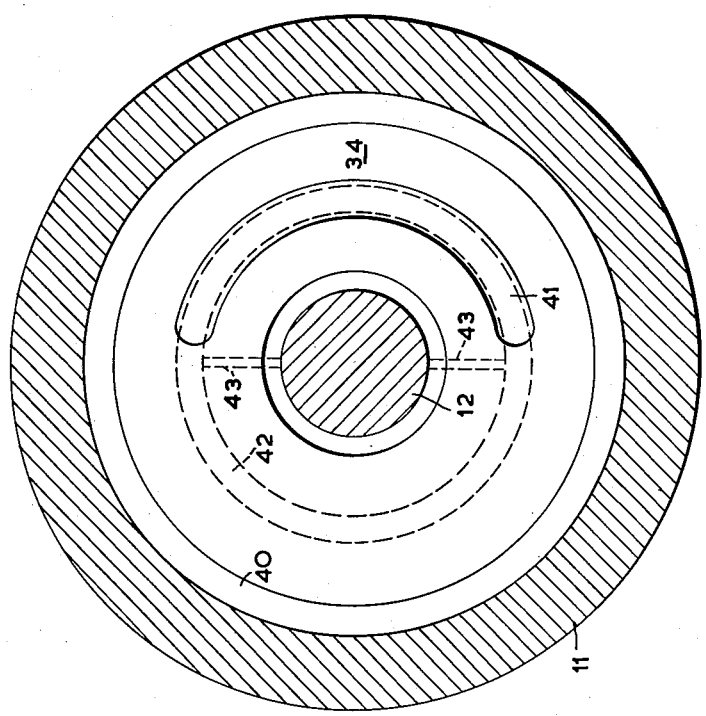

United States Patent Office 2,980,077
Patented Apr. 18, 1961

2,980,077
HYDRAULIC DEVICES

George Maurice Martin Magill, Bradford, England, assignor to The English Electric Company Limited, London, England, a British company Filed Mar. 3, 1960, Ser. No. 12,566
Claims priority, application Great Britain Mar. 17, 1959
1 Claim. (Cl. 121—62)

This invention relates to hydraulic swashplate devices.

According to the invention, a hydraulic swashplate device includes, in combinations, a swashplate, a cylinder block having a plurality of pistons slidable therein, each piston having a co-axial cylinder, closed at the inner end thereof, in which is slidably mounted a plunger, a self-aligning pressure pad being mounted at the outer end of the plunger, spring means for maintaining a clearance space between the closed end of the auxiliary cylinder and the plunger, duct means passing from said clearance space to the bearing face of the pressure pad, and supply duct means in the face of the swashplate for supplying hydraulic fluid to the clearance spaces through said duct means during the period of low pressure engagement of the pressure pads on the swashplate whereby pressurized hydraulic fluid is supplied through said duct means to the bearing faces of the pressure pads during the period of high pressure engagement of the pressure pads on the swashplate.

Further features of the invention will appear from the following description with reference to the accompanying drawing wherein Fig. 1 is a longitudinal section of one form of hydraulic swashplate pump according to the invention and Fig. 2 is a section on the line A—A of Fig. 1.

Referring now to the drawing, a cylinder block 10 is rotatable within the casing 11 by means of a shaft 12. This shaft extends through an end plate 13 and is supported by roller bearings 14 and 15 mounted in the casing and end plate respectively.

A fixed valve plate 16 has an annular groove 17, bridged to form two separate chambers, one being in communication with the charge line 18 and the other being in communication with the delivery line 19.

The cylinder block 10 includes a plurality of axially-disposed cylinders 20 having ports 21 to communicate with the annular groove 17 in the valve plate 16.

A piston 22 is slidably mounted in each cylinder 20. This piston is bored to form therein a co-axial auxiliary cylinder 23, an end bore 24 and an internal flange 25.

A plunger 26 is adapted to slide in the auxiliary cylinder 23 and has an end portion 27 slidable in the bore 24. The piston 22 and the plunger 26 are urged apart by a compression spring 28 seated on the end portion 27 and engaging the flange 25 so that an annular clearance space 29 is maintained in the auxiliary cylinder 23. Seals 30 and 31 are fitted to the plunger so as to be disposed on each side of the clearance space 29. The plunger 26 seats a self-aligning pressure pad 32 having a bearing face 33 engaging a swashplate 34. Formed in the bearing face is an annular groove 35 connected to the clearance space 29 by ducts 36 and 37 in the plunger and 38 and 39 in the pressure pad.

The swashplate is mounted on a seating 40 and has formed therein an arcuate cut-out 41 designed to be in communication with the clearance space 29 during the charge stroke of the plunger. An annular channel 42 in the seating 40 leads into the cut-out 41 and is connected by channels 43 to the inside of the casing 11. The casing 11 is flooded with hydraulic fluid at reservoir pressure.

During the charge stroke of the piston 22, hydraulic fluid inside the casing 11 is able to flow freely into the clearance space 29 by way of the cut-out 41 in the swashplate 34, ducts 38 in the pressure pad and 37 in the plunger.

During the delivery stroke, hydraulic fluid is trapped in the clearance space 29, the ducts 36, 37, 38 and 39 and the annular groove 35, and a pressure is developed which is greater than the pump delivery pressure although proportional to it, depending on the ratio of the differential annular areas indicated at 44 and 45 respectively. Hydraulic fluid at intensified pressure is thus fed to each bearing face engaging the swashplate.

Leakage of this high pressure fluid from the bearing face will be recouped during the subsequent charge stroke, when the clearance space 29 will be recharged.

If the charge pressure is insufficient to maintain the plungers in co-operation with the swashplate during the charge stroke, the pistons may be fitted with light compression springs.

The device may be modified to act as a motor if hydraulic fluid is supplied at high pressure to line 19 and exhausted from line 18.

In an alternative embodiment of the invention, the device incorporates a variable angle swashplate.

In another alternative embodiment the device incorporates a driven swashplate and a stationary cylinder block. In such an arrangement the main flow of oil to and from the cylinders 20 will be controlled by individual valves for each cylinder, such valves being timed, or flow-operated.

What I claim as my invention and desire to secure by Letters Patent is:

A hydraulic swashplate device including, in combination, a swashplate, a cylinder block having a plurality of pistons slidable therein, each piston having a co-axial cylinder, closed at the inner end thereof, in which is slidably mounted a plunger, a self-aligning pressure pad being mounted at the outer end of the plunger, spring means for maintaining a clearance space between the closed end of the auxiliary cylinder and the plunger, duct means passing from said clearance space to the bearing face of the pressure pad, and supply duct means in the face of the swashplate for supplying hydraulic fluid to the clearance spaces through said duct means during the period of low pressure engagement of the pressure pads on the swashplate, whereby pressurized hydraulic fluid is supplied through said duct means to the bearing faces of the pressure pads during the period of high pressure engagement of the pressure pads on the swashplate.

References Cited in the file of this patent

UNITED STATES PATENTS 1,487,965    Mitchell _____ Mar. 25, 1924

FOREIGN PATENTS 1,059,697    France _____ Nov. 10, 1953